March 14, 1961  L. L. STOTT  2,975,128
NYLON POLYTETRAFLUOROETHYLENE COMPOSITION AND ARTICLE
Original Filed Sept. 21, 1954
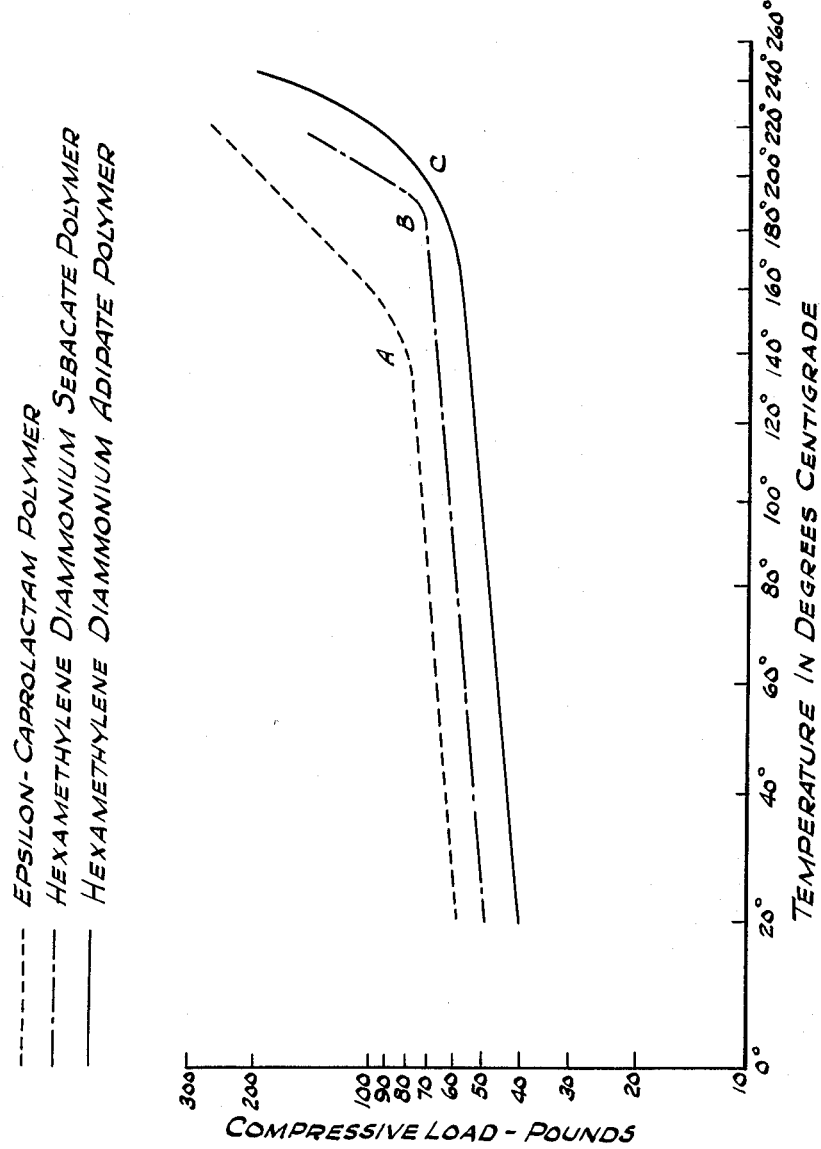
INVENTOR.
LOUIS L. STOTT
BY
ATTORNEY

United States Patent Office 2,975,128
Patented Mar. 14, 1961

2,975,128

NYLON POLYTETRAFLUOROETHYLENE COMPOSITION AND ARTICLE

Louis L. Stott, Wyomissing, Pa., assignor to The Polymer Corporation, Reading, Pa., a corporation of Pennsylvania Continuation of abandoned application Ser. No. 457,370, Sept. 21, 1954. This application Aug. 21, 1958, Ser. No. 756,749

9 Claims. (Cl. 252—12)

This invention relates to the art of molding high molecular weight synthetic linear polyamides. The present application is a continuation of my application Serial No. 457,370, filed September 21, 1954, entitled Nylon Polytetrafluoroethylene Composition and Article, and abandoned August 25, 1958. Said application Serial No. 457,370 was a continuation-in-part of my applications Serial No. 227,283, filed May 19, 1951, abandoned September 24, 1954, and Serial No. 272,966 filed February 23, 1952, now Patent 2,695,425, issued November 30, 1954. The synthetic polymeric materials used in the practice of this invention are the synthetic linear polyamides of the general type described in United States Patents 2,071,250, 2,071,254 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above, or as otherwise identified hereinafter, can be obtained, for example, by self-polymerization of monoamino-monocarboxylic acid, or by reacting a diamine with a dibasic carboxylic acid in substantially equimolecular amounts, it being understood that reference herein to the amino acids, diamines, and dibasic carboxylic acids, is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the interpolymers, as well as in the simple polyamides, the average number of carbon atoms separating the amide groups is at least two. On hydrolysis with hydrochloric acid, the amino acid polymers yield the amino acid hydrochloride and the dibasic carboxylic acid. In any case, the polyamides are limited to those which are soluble in phenol at room temperature and are insoluble in ethylene glycol except at temperatures above about 140° C. For the sake of simplicity the linear polyamides described above will be referred to herein as nylon.

Although these materials were originally introduced as fibers for use in the textile industry, they have subsequently been made available as raw materials for the molding and extrusion industries. The high melting nylons, such as polyhexamethylene adipamide, and polyhexamethylene sebacamide, are characterized by relatively sharp melting points and high fluidity in the molten condition in comparison to other thermoplastic materials, such as cellulose acetate and polystyrene. These characteristics have made compression molding of these nylons difficult. At the present time shaped nylon pieces are prepared commercially, either by machining solid nylon, such as nylon rod, or by melting nylon and forming it by injection molding. Both of these methods have certain drawbacks. Bearings machined from nylon rod, for instance, are relatively expensive to make and involve much waste. Furthermore, the manufacturing techniques for producing nylon rod, particularly for the larger sizes, usually introduce severe strains which must be removed by conditioning. The injection molding technique requires complicated and expensive apparatus, high cost molds, and also frequently results in a product having many strains. These strains cause bearings prepared by injection molding to seize readily if large clearances are not provided. The presently used molding techniques depend upon heating a polyamide above its melting point and exerting pressure on the molten material. The strains produced in the resultant article come as a consequence of cooling the molten material and, at least in part, are due to a relatively high volumetric shrinkage on solidification.

In accordance with my U.S. application Serial No. 227,283, filed May 19, 1951, molded nylon articles containing fillers are described. These articles are made by compressing nylon powder preferably having a diameter of 40 microns or less and a finely divided filler with sufficient pressure so that they may be handled. The compressed article is thereafter sintered by heating to a temperature just below the melting point of the nylon. Such fillers are capable of imparting special desirable characteristics to nylon molded articles. Among such general characteristics is decreased sensitivity to humidity. In addition certain fillers impart important specific characteristics to nylon molded articles. Such a filler as polytetrafluoroethylene materially reduces the coefficient of friction of molded articles made from a nylon-polytetrafluoroethylene mixture as compared to articles made from nylon alone.

It is technically extremely difficult to get a uniform dispersion of polytetrafluoroethylene in molten nylon or mechanically to mix finely divided nylon and polytetrafluoroethylene particularly where the polytetrafluoroethylene filler is desired in high concentrations. The melting of nylon containing the polytetrafluoroethylene causes an uneven distribution of the filler in the molten nylon, while the mechanical mixing of the very light powdered nylon and polytetrafluoroethylene does not give finished products of acceptable strength except where polytetrafluoroethylene is present in amounts of 5 percent or less by weight. These difficulties of mixing have been overcome by the process herein described to give a homogeneous mixture of finely divided polyamides and polytetrafluoroethylene which upon pressing and sintering yield products of good strength.

It is an object of this invention to produce powder and molded articles of modified nylon, i.e., nylon having a filler which imparts physical characteristics which differ from those of usual nylon articles. Another object is to prepare molded nylon articles having greater dimensional stability during humidity changes than unmodified nylon articles. A further object is to produce modified nylon articles having lower coefficients of friction than exhibited by pure nylon articles. Still another object is to produce nylon articles having polytetrafluoroethylene evenly distributed throughout the finished articles. Yet another object is to produce modified nylon bearings and bushings which exhibit low coefficients of friction over an extended period of time.

Nylon powder having an ultimate particle size of less than 40 microns is mixed thoroughly with finely divided polytetrafluoroethylene and compressed to the desired shape with sufficient pressure so that the shaped green article may be handled. The compressed article is thereafter heated to a temperature sufficient to sinter the particles of nylon together without inducing any substantial molten phase. The article may be annealed to remove any residual strains.

It is essential that a substantial portion of the nylon particles be below about 40 microns in diameter and preferably below 25 microns, but the optimum size appears to be 10 microns or less. Nylon of this size may be obtained in accordance with the process described in United States application Serial No. 95,587, now U.S. Patent 2,592,616, filed in the names of Louis L. Stott and Laurence R. B. Hervey on May 26, 1959; United States application Serial No. 273,566, now United States Patent 2,742,440 filed in the names of Louis L. Stott and Laurence R. B. Hervey on February 26, 1952; and United States application Serial No. 202,405, now United States Patent 2,639,278, filed in the names of Louis L. Stott and Laurence R. B. Hervey on December 22, 1950. These methods disclose that nylon may be dissolved in mixtures of lower alcohols anl water or in methanol alone under pressure and at elevated temperatures, and that nylon may be dissolved in polyhydric alcohols merely by heating them together. Oxygen is excluded during the heating step. Upon cooling, the nylon precipitates as a fine powder which, when washed and dried, is suitable for the present process. In the case of polyhydric alcohols cooling may conveniently be accomplished by adding water to the hot nylon solution. If waste nylon is employed, undissolved material is preferably removed when the polymer is in solution.

It has been found preferable to use nylon which has been prepared in the manner just described. This may be because of the difficulty in obtaining material having an average ultimate particle size of less than 40 microns as is obtained by the process described. It is also to be recognized that the product obtained by precipitating nylon as described in the above-identified applications is crystalline in character and becomes more so upon sintering as disclosed by X-ray diffraction patterns. But for whatever the reason, the nylon must be reduced in size to the order of less than 40 microns in diameter.

The polytetrafluoroethylene used as an additive should preferably be in a finely divided state. However, the average ultimate particle size of the polytetrafluoroethylene depends to some extent upon the quantity of polytetrafluoroethylene incorporated in the nylon. Thus, it has been found permissible to use relatively larger polytetrafluoroethylene particle sizes in polyamide polytetrafluoroethylene mixtures containing small quantities of polytetrafluoroethylene. The reason for this apparent effect introduced by particle size is not known.

I have found that contrary to established procedures for handling thermoplastic materials it is possible to cold press the polyamide-polytetrafluoroethylene mixture, remove the article from the mold and subsequently sinter the finely divided materials into finished articles, provided the starting particle sizes are of the order indicated. No precautions need be observed with respect to the type of metals coming in contact with the nylon. Although polytetrafluoroethylene may be added to the finely divided polyamides in amounts of from 2 percent up to 75 percent, by weight of the nylon-polytetrafluoroethylene mixture, the optimum amount of polytetrafluoroethylene for molded articles showing low coefficients of friction and good wear properties depends upon the hardness of the finely divided polyamide and its ability to bond the filler in the finished article. Thus, for example, a hard polyhexamethylene adipamide can contain more of the relatively softer polytetrafluoroethylene and the amount of polytetrafluoroethylene may range from about 30 to 75 percent by weight of the mixture, while a preferred range is from about 40 to 50 percent. In a moderately hard polyhexamethylene sebacamide, for example, the quantity of polytetrafluoroethylene may range from about 10 to 50 percent polytetrafluoroethylene by weight of the total mixture while the preferred range is about 20 to 30 percent. With a softer polymer such as an epsilon-caprolactam containing relatively large amounts of monomer the quantity of polytetrafluoroethylene may range from 2 to 15 percent while the preferred range is about 3 to 10 percent by weight of total mixture.

If other fillers are added in addition to polytetrafluoroethylene, the total quantity of filler should not exceed 85 percent by bulk volume of the powder mixture.

Polytetrafluoroethylene, as do other fillers, reduces the hygroscopic expansion of the final molded articles as compared to articles made of nylon alone. Articles molded from a nylon-polytetrafluoroethylene mixture possess another very important and unexpected advantage over articles molded from nylon or polytetrafluoroethylene powders alone. This advantage consists of a marked decrease in coefficient of friction over the entire test or use period. It has been noted that bearings and bushings molded from a finely divided polyamide powder, such as polyhexamethylene adipamide, show a decided and sharp early peak in coefficient of friction. This peak generally, but not always, occurs at about 4 to 5 minutes after the test is begun. After this peak is attained, the coefficients of friction drop rapidly and then level off to a more or less constant value. Even though this peak may be of a comparatively short duration, the period of its existence may well be sufficient to cause overheating of the shaped article and may result in seizure or excessive wear. The reduction or elimination of this peak by the addition of polytetrafluoroethylene, therefore, makes it possible to materially reduce the effects of the peak and to maintain coefficients of friction at a minimum. In addition to reducing or entirely eliminating this peak in coefficient of friction, the use of polytetrafluoroethylene also markedly reduces the over-all, long term coefficient of friction, thus reducing the overall wear.

For example, sample molded pieces were made up of pure finely divided polyamide molding powders and of mixtures containing varying quantities of polytetrafluoroethylene. The finely divided polyamides were prepared by dissolving 240 grams of the polyamide (either virgin or scrap material) in 1500 grams of ethylene glycol in a carbon dioxide atmosphere at 193° C. Sufficient quantities of finely divided polytetrafluoroethylene to make up the desired composition were added to the hot solution and the solution was allowed to cool to 155° C. when it was quenched with an excess of cold water. The coprecipitated polyamide-polytetrafluoroethylene mixture was then washed to remove the ethylene glycol and dried. All of the varying compositions made up were completely homogeneous powder mixtures.

Portions of each of the powder mixtures prepared in the above described manner were pressed at room temperature at a pressure of 25 tons per square inch to give sample pieces suitable for use in a machine designed to measure coefficient of friction. These sample pieces were removed from their molds and heated in vacuum, the ones containing polyhexamethylene adipamide to 263° C., those containing polyhexamethylene sebacamide to 220° C., and those containing the polymer of epsilon-caprolactam to 215° C. After the sample pieces were heated throughout to the sintering temperature, they were removed from the vacuum and cooled.

The sample pieces were then evaluated for coefficients of friction by rubbing against them a metal wear cap attached to a vertical rotating shaft. A load was applied by a lever-arm and weight system which thrust the bushing against the wearing surface of the wear cap. The cap was rotated at 620 r.p.m. and loads of 50 and 200 p.s.i. were applied.

In terms of this test, the most desirable sample is one which displays a low coefficient of friction (both during break-in and at the end of the test), low wearing rate, absence of wear on the wear cap and low temperature of wear cap during operation. Table I illustrates the effect of the addition of polytetrafluoroethylene to polyhexamethylene adipamide and shows that at the beginning of the tests the coefficients of friction were as good or better than for the polyamide alone, and that the peaks were materially reduced. At the end of the test the coefficients of friction were markedly reduced while wear was reduced either to a negligible quantity or a fraction of that exhibited by the polyamide sample. In addition to the quantitative data in Table I, a qualitative examination of the wear cap showed less burning where the sample contained polytetrafluoroethylene; approximately the same degree of heat generation for all samples; about the same extent of streaks or scratches put on the wear cap; and somewhat less deposit of the sample material on the wear cap in the case of the polytetrafluoroethylene-containing samples.

TABLE I

*Coefficient of friction—friction and wear properties at 50 p.s.i. and 620 r.p.m.*

| Percent Polyhexa-methylene Adipamide | Percent Polytet-rafluoro-ethylene | Coefficient of Friction | | | |
|---|---|---|---|---|---|
| | | At start | 4–5 min. Peak | At end 24 hrs. | Wear after 24 hrs. |
| 100 | 0 | 0.23 | 1.12 | 0.75 | 0.0066. |
| 93 | 7 | 0.23 | 0.99 | 0.25 | negligible. |
| 90 | 10 | 0.11 | 0.26 | 0.93 | negligible. |
| 40 | 60 | 0.23 | 0.40 | 0.14 | negligible. |
| 25 | 75 | 0.23 | 0.40 | 0.20 | 0.0028. |

Table II gives similar data for polyhexamethylene adipamide and polyhexamethylene sebacamide mixed with polytetrafluoroethylene and tested under a higher load then in Table I. The same reduction in the coefficient of friction achieved by the addition of polytetrafluoroethylene is shown by these data.

TABLE II

*Coefficient of friction—friction and wear properties at 200 p.s.i. and 620 r.p.m.*

| Polyamide | Percent Poly-amide | Percent Polytet-rafluoro-ethylene | Coefficient of Friction | | | |
|---|---|---|---|---|---|---|
| | | | At Start | 4–5 min. Peak | At end 2½ hrs. | Wear after 2½ hrs. |
| | | | | | | In. |
| Polyhexamethylene Adipamide | 100 | 0 | 0.14 | 0.38 | 0.24 | 0.0398 |
| Do | 40 | 60 | 0.18 | 0.19 | 0.14 | negligible. |
| Polyhexamethylene Sebacamide | 100 | 0 | 0.23 | 0.29 | 0.19 | 0.0625 |
| Do | 70 | 30 | 0.12 | 0.28 | 0.05 | 0.0633 |

It will be noted at these higher loads the addition of 60% polytetrafluoroethylene to polyhexamethylene adipamide improves the wearing properties, but the addition of 30% polytetrafluoroethylene to the lower melting point polyhexamethylene sebacamide appears to decrease the wearing ability. However, at the lower load of 50 p.s.i. the addition of 30% polytetrafluoroethylene to polyhexamethylene sebacamide improves the wearing characteristics.

To incorporate the polytetrafluoroethylene, it may be wet mixed with the nylon, or may be mixed with the nylon after it has been dissolved in an agent which is a swelling agent for the nylon at elevated temperatures and a non-swelling agent at room temperature. The nylon-polytetrafluoroethylene mixture is then precipitated out as a homogeneous mixture by cooling or adding a non-swelling agent. In the last named method of mixing, the polytetrafluoroethylene may be added to the nylon while it is dissolved in the swelling agent, after it is precipitated out and still dispersed in the swelling agent or after the swelling agent is removed and the finely divided polyamide is still wet. In all cases where the polytetrafluoroethylene is added in amounts exceeding 5 percent by weight of the mixture polytetrafluoroethylene is added to the polyamide when wet.

The mixture of nylon powder with polytetrafluoroethylene is briquetted by the use of sufficient pressure to cause the resultant shaped article to withstand moderate shocks incident to its handling. The pressures employed range generally between about 10 tons per square inch and 50 tons per square inch. The pressures do not seem to be critical, but it has been found that about 25 tons per square inch is a very satisfactory pressure. Pressure in the order of 3 tons per square inch yields a briquette which may be handled only with considerable care and when fired has a compressive strength of less than one-half that of a similar piece pressed at 25 tons per square inch. Pressures in excess of 75 tons per square inch are not required. The resultant "cold" preformed article is then sintered by heating it under non-oxidizing conditions to a temperature below the melting point of the nylon present for a time sufficient to cause the article to be strong and hard when cooled. In accordance with application Serial No. 272,966 filed February 23, 1952, in the name of Louis L. Stott, I have found that if several pieces are molded from nylon powder at room temperature and sintered at various temperatures ranging from slightly above room temperature up to nearly the melting point and the resultant pieces are tested for compression strength, that an interesting phenomenon becomes apparent. Referring now to the drawing, the curves are plots of the loads required to break bearings 1 inch long, ½ inch I.D. and ¾ inch O.D. when the loads are applied along the surface perpendicular to the axis. Curve A is a plot of epsilon-caprolactam polymer sintered at various temperatures; curve B is a plot of the loads required to break similar bearings of polyhexamethylene sebacamide sintered at various temperatures, and curve C is a plot of the loads required to break similar bearings of polyhexamethylene adipamide at various temperatures. The bearings were sintered in vacuo.

It will be noted that in the accompanying drawing, the log of the compressive load is plotted against the reciprocal of the temperature in degree absolute (degree centigrade +273°). Since two substantially straight lines result from plotting increasing sintering temperatures for each material, it is apparent that below the inflection point on any curve a single process is operative which is a function solely of an activation energy and the temperature. Above the inflection point a new process is operative with a different activation. It is this second process with which this invention is concerned since sintering below the inflection point is ineffective. This inflection point is displayed not only for the pure polyamides but also for mixtures containing polytetrafluoroethylene.

It is not known why the strength suddenly begins to increase at a rapid rate, but the inflection point may be easily determined for any given polyamide. Reference will be made hereafter to the break in the curve as the inflection point. The temperature to which the polyamide should be heated is therefore above the inflection point and below the point where any substantial molten phase occurs. If any substantial amount of molten phase occurs, the article warps, blisters and becomes unusable. As may be observed, the temperature to which the polytetrafluoroethylene mixtures containing polyhexamethylene adipamide should be sintered is from about 200° C. to about 263° C., those containing hexamethylene sebacamide is from about 190° C. to about 220° C. and those containing the polymer of epsilon-caprolactam is from about 160° C. to about 215° C.

Before molding the powder mixture it may be granulated, if desired, to obtain freer flowing powder. Molding is advantageously accomplished by placing the granulated powder mixture in a mold or otherwise compressing it as by passing it through pressure rollers.

After forming, the cold preformed nylon-polytetrafluoroethylene article is then sintered by heating it under non-oxidizing conditions. The time range is usually between 2 to 30 minutes.

The presence of moisture in the nylon powder can, under some conditions, cause cracks to appear in the article on sintering. This is particularly true when the sintering is done in hot oil as contrasted with sintering in vacuo. It has been found that relatively small bearings containing 3% moisture or more before sintering, will crack if immersed directly in hot oil. On the other hand, a similar bearing first immersed in cold oil and then the oil raised slowly to the sintering temperature will be free from cracks. It is therefore preferred to keep the moisture content of the formed nylon-polytetrafluoroethylene article before sintering as low as possible, preferably below about 1% moisture. In the case of large solid objects, the presence of moisture is more critical and a vacuum drying step either on the powder mixture or the preformed article is desirable.

In the above discussion the pressing has been assumed to take place at about room temperature. If the temperature of the mold is raised to a point close to the melting point of the nylon, very unsatisfactory material is produced. A somewhat elevated temperature may be tolerated, however, and such temperature appears to add some strength to the "green" article, but does not materially affect the finished product when sintered. It is essential therefore that the pressing be accomplished at a temperature below that at which any molten phase can occur and preferably at or about room temperature.

The reason for the extremely tight bond obtained by my process is not apparent. It may be that the high pressure employed, followed by sintering, causes sufficient reorientation analogous to crystal growth to secure adequate bonding. But whatever the reason may be, it is totally unexpected that a strong bond would form and it is unexpected that any amounts of polytetrafluoroethylene up to 75 percent of the total weight or of polytetrafluoroethylene plus other filler up to 85 percent by bulk volume would yield articles of surprising strength.

A further unexpected advantage is secured by my technique in that powder obtained from waste textile nylon, such as stocking material, may be successfully used either alone, or in conjunction with powder obtained from virgin nylon. All attempts to melt and mold or extrude waste nylon have resulted heretofore in excessively brittle products not suitable for commercial use. It is apparent therefore that the high cost factors restricting the wider use of molding nylon shapes have been largely overcome by the process described herein. The special and expensive tools required by the present techniques are replaced by the relatively simple and available cold pressing equipment used for example in the powder metallurgy art; and the relatively expensive virgin nylon may be substituted in whole, or in part, by nylon obtained from nylon scrap and textile waste, such as textile clippings and stockings.

If close tolerances are not required, the pressed, sintered articles may be satisfactorily used without subsequent conditioning or annealing to remove strains which may occur to a minor extent in the molded articles. In some bearings and other articles the necessity for close tolerances requires that the article be free from slight additional shrinkages in service. Annealing is accomplished by simply heating the article, preferably under non-oxidizing conditions, to a temperature under, but preferably close, i.e., within 50° C. to the melting point of the polyamide for a few minutes to an hour and slowly cooling. Holding for longer times at lower temperatures also reduces strains. In some cases annealing may be combined with the sintering step to avoid two furnace treatments.

If desired, lubricating agents in minor amounts may be added to facilitate and improve uniformity of the shaped piece and to aid the removal of the pressed piece from the die or for other purposes. Useful lubricants include stearates such as zinc stearate, hydrogenated cotton seed oil, or other greasy or soapy substances which may be either intermixed with the polytetrafluoroethylene filled nylon powder or coated on the die surfaces. Small amounts of other minor ingredients may be added to improve the flowing properties of the dry powder mixtures or to aid in obtaining uniform physical properties in the sintered product.

One of the important uses for pressed and sintered finely divided nylon containing polytetrafluoroethylene has proved to be in the field of bushings and bearings. Polyhexamethylene adipamide in particular has exhibited considerable merit for bushings or bearings operating where very low coefficients of friction are required. The bushings and bearings made in accordance with this process are superior to any nylon bushings or bearings made from nylon by any of the present standard techniques and have the advantages of being free from any gross amount of strain and of possessing low coefficients of friction. Tests have indicated that the tendency to seize is less than that of injection molded bushings and bearings and therefore they may be made to closer tolerances. Other articles which may be advantageously prepared by the process of this invention include various small irregular shapes employed where the wear resistance and strength are important factors. Such articles include, but are not limited to, small rollers, cams, valve seats, gears, etc., and articles requiring good strength and low coefficients of frictions.

As many apparently widely different embodiments of this invention may be made without departing from the spirit and scope thereof, it is to be understood that I do not limit myself to the specific embodiments thereof except as defined in the appended claims.

I claim:

1. A composition consisting essentially of a mixture of finely divided linear polyamide and polytetrafluoroethylene, said linear polyamide being a polyamide which is soluble in phenol at room temperature and insoluble in ethylene glycol except at temperatures above about 140° C. and having an ultimate particle size of less than 40 microns, said polytetrafluoroethylene being present in a concentration of from 2 to 75 percent by weight of said mixture.

2. A composition consisting essentially of a mixture of finely divided linear polyamide and a filler, said linear polyamide being a polyamide which is soluble in phenol at room temperature and insoluble in ethylene glycol except at temperatures above about 140° C. and having an ultimate particle size of less than 40 microns, said filler being present in a concentration up to 85 percent of the bulk volume of the mixture and containing polytetrafluoroethylene in a concentration of from 2 to 75 percent by weight of said polyamide-filler mixture.

3. A composition consisting essentially of a mixture of finely divided linear polyamide and polytetrafluoroethylene, said linear polyamide being a polyamide which is soluble in phenol at room temperature and insoluble in ethylene glycol except at temperatures above about 140° C., said mixture having been formed by adding said polytetrafluoroethylene to a solution of said polyamide in ethylene glycol, cooling to co-precipitate the resulting mixture of polyamide and polytetrafluoroethylene, and washing and drying said co-precipitated mixture, said polytetrafluoroethylene being present in a concentration of from 2 to about 75 percent by weight of said mixture.

4. A shaped polyamide article consisting essentially of sintered polyhexamethylene adipamide and polytetrafluoroethylene, said polyhexamethylene adipamide having an average ultimate particle size of less than 40 microns, said polytetrafluoroethylene constituting from about 40 to 50 percent by weight of said article, said article being characterized by being bonded by sintering action alone.

5. A shaped polyamide article consisting essentially of sintered polyhexamethylene sebacamide and polytetrafluoroethylene, said polyhexamethylene sebacamide having an average ultimate particle size of less than 40 microns, said polytetrafluoroethylene constituting from about 20 to 30 percent by weight of said article, said article being characterized by being bonded by sintering action alone.

6. A shaped polyamide article consisting essentially of sintered epsilon-caprolactam polymer and polytetrafluoroethylene, said epsilon-caprolactam polymer having an average ultimate particle size of less than 40 microns, said polytetrafluoroethylene constituting from about 3 to 10 percent by weight of said article, said article being characterized by being bonded by sintering action alone.

7. A bearing of low coefficient of friction consisting essentially of sintered polyhexamethylene adipamide and polytetrafluoroethylene, said polyhexamethylene adipamide having an average ultimate particle size of less than 40 microns, said polytetrafluoroethylene constituting about 50 percent by weight of said bearing, said bearing being characterized by being bonded by sintering action alone.

8. A shaped polyamide article of low coefficient of friction consisting essentially of sintered synthetic linear polyamide and polytetrafluoroethylene, said polyamide being one which is soluble in phenol at room temperature and insoluble in ethylene glycol except at temperatures above about 140° C. and having an ultimate particle size of less than 40 microns, said article containing a sufficient amount of polytetrafluoroethylene to materially reduce the coefficient of friction as compared with that of the polyamide alone but not more than about 75 percent by weight of said article, said article being characterized by being bonded by sintering action alone.

9. A composition for use in forming articles of low coefficient of friction consisting essentially of a mixture of finely divided linear polyamide and polytetrafluoroethylene, said linear polyamide being a polyamide which is soluble in phenol at room temperature and insoluble in ethylene glycol except at temperatures above about 140° C. and having an ultimate particle size of less than 40 microns, the composition containing a sufficient amount of the polytetrafluoroethylene to materially reduce the coefficient of friction of an article formed from the composition as compared to an article made from the polyamide alone, but not more than about 75 percent by weight of said mixture.

References Cited in the file of this patent

UNITED STATES PATENTS

| | | |
|---|---|---|
| 2,246,086 | Austin | June 17, 1941 |
| 2,345,533 | Graves | Mar. 28, 1944 |
| 2,400,091 | Alfthan | May 14, 1946 |
| 2,592,616 | Stott et al. | Apr. 15, 1952 |
| 2,639,278 | Stott et al. | May 19, 1953 |
| 2,695,425 | Stott | Nov. 30, 1954 |
| 2,698,966 | Stott et al. | Jan. 11, 1955 |
| 2,748,099 | Bruner et al. | May 29, 1956 |